United States Patent
Takahashi et al.

(10) Patent No.: US 11,978,211 B2
(45) Date of Patent: May 7, 2024

(54) CELLULAR IMAGE ANALYSIS METHOD, CELLULAR IMAGE ANALYSIS DEVICE, AND LEARNING MODEL CREATION METHOD

(71) Applicant: Shimadzu Corporation, Kyoto (JP)

(72) Inventors: Wataru Takahashi, Kyoto (JP); Ayako Akazawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 832 days.

(21) Appl. No.: 16/976,680

(22) PCT Filed: Mar. 8, 2018

(86) PCT No.: PCT/JP2018/009046
§ 371 (c)(1),
(2) Date: Jan. 14, 2021

(87) PCT Pub. No.: WO2019/171546
PCT Pub. Date: Sep. 12, 2019

(65) Prior Publication Data
US 2021/0133963 A1  May 6, 2021

(51) Int. Cl.
*G06T 7/11* (2017.01)
*G06T 7/00* (2017.01)
(Continued)

(52) U.S. Cl.
CPC .............. *G06T 7/11* (2017.01); *G06T 7/0012* (2013.01); *G06V 10/454* (2022.01); *G06V 10/82* (2022.01);
(Continued)

(58) Field of Classification Search
CPC ....... G06T 7/00121; G06T 2207/10056; G06T 2207/20081; G06T 2207/20084;
(Continued)

(56) References Cited

U.S. PATENT DOCUMENTS

2002/0159642 A1* 10/2002 Whitney ................. G06F 18/41
382/225
2008/0166035 A1    7/2008 Qian et al.
(Continued)

FOREIGN PATENT DOCUMENTS

| CN | 106462746 A | 2/2017 |
|---|---|---|
| CN | 107003638 A | 8/2017 |

(Continued)

OTHER PUBLICATIONS

Naoki (Computer English Translation of Japanese Patent No. JP2017-117335 A), pp. 1-9. (Year: 2017).*
(Continued)

*Primary Examiner* — Daniel G Mariam
(74) *Attorney, Agent, or Firm* — Muir Patent Law, PLLC (57) ABSTRACT

A phase image is formed by calculation from a hologram image of a cell, and segmentation is performed for each pixel for the phase image using a fully convolution neural network to identify an undifferentiated cell region, a deviated cell region, a foreign substance region, and the like. When learning, when a learning image included in a mini-batch is read, the image is randomly inverted vertically or horizontally and then is rotated by a random angle. A part that has been lost within the frame by the pre-rotation image is compensated for by a mirror-image inversion with an edge of a post-rotation image as an axis thereof. Learning of a fully convolution neural network is performed using the generated learning image. The same processing is repeated for all mini-batches, and the learning is repeated by a predetermined number of times while shuffling the training data allocated to the mini-batch. The precision of the learning model is thus improved. In addition, since rotationally invariant characteristics can be learned, it is possible to identify cell colonies of various shapes with good precision.

11 Claims, 7 Drawing Sheets

(51) Int. Cl.
*G06V 10/44* (2022.01)
*G06V 10/82* (2022.01)
*G06V 20/69* (2022.01)

(52) U.S. Cl.
CPC .. *G06V 20/695* (2022.01); *G06T 2207/10056* (2013.01); *G06T 2207/20081* (2013.01); *G06T 2207/20084* (2013.01); *G06T 2207/30024* (2013.01)

(58) Field of Classification Search
CPC .......... G06T 2207/30024; G06V 10/82; G06V 10/454; G06V 20/695; G06N 20/00
See application file for complete search history.

(56) References Cited

U.S. PATENT DOCUMENTS

| | | |
|---|---|---|
| 2009/0297015 A1 | 12/2009 | Jetzek |
| 2011/0228069 A1 | 9/2011 | Mimura et al. |
| 2017/0132450 A1 | 5/2017 | El-zehiry et al. |
| 2017/0193175 A1 | 7/2017 | Madabhushi et al. |
| 2017/0310851 A1 | 10/2017 | Dobashi et al. |
| 2017/0329281 A1 | 11/2017 | Tagawa et al. |
| 2018/0365842 A1* | 12/2018 | Bozorgtabar ........ G06V 20/698 |
| 2019/0066299 A1* | 2/2019 | Maeda ................. C12M 1/34 |
| 2019/0294107 A1 | 9/2019 | Kondo et al. |
| 2020/0121228 A1* | 4/2020 | Taylor ................. A61B 5/00 |

FOREIGN PATENT DOCUMENTS

| | | |
|---|---|---|
| CN | 107563411 A | 1/2018 |
| CN | 107622238 A | 1/2018 |
| EP | 3155558 A | 4/2017 |
| EP | 3223083 A1 | 7/2017 |
| JP | H10-268740 A | 10/1998 |
| JP | 2011-077967 A | 4/2011 |
| JP | 4968595 A | 4/2012 |
| JP | 5181385 A | 1/2013 |
| JP | 2017-117335 A | 6/2017 |
| JP | 2017-519985 A | 7/2017 |
| JP | 2017-199981 A | 11/2017 |
| WO | 2015/195609 A1 | 12/2015 |
| WO | 2016/084420 A1 | 2/2016 |
| WO | 2017110640 A1 | 6/2017 |
| WO | 2017/203718 A1 | 11/2017 |
| WO | 2017/204013 A1 | 11/2017 |

OTHER PUBLICATIONS

Toshiyuki, et al. (Computer English Translation of Japanese Patent No. JP 2017-199981A), pp. 1-14. (Year: 2017).*
Noha, et al. (Computer English Translation of Japanese Patent No. JP2017-519985A), pp. 1-14. (Year: 2017).*
Notice of Allowance dated Sep. 20, 2022 for corresponding Japanese Application No. JP 2020-504598, submitted with a machine translation.
Second Office Action dated Apr. 12, 2022 issued for corresponding Japanese Application No. JP 2020-504598, submitted with a machine translation.
Written Opinion of the International Searching Authority (ISA237) for PCT application No. PCTJP2018009046 dated Jun. 5, 2018, submitted with a machine translation.
"Cell Culture Analyzer CultureScanner CS-1", [online], Shimadzu Corporation, [Searched on Feb. 14, 2017, downloaded on Oct. 20, 2020], Internet <URL:https://www.an.shimadzu.co.jp/bio/cell/cs1/index.htm> submitted with a machine translation.
Long et al., "Fully Convolutional Networks for Semantic Segmentation", The IEEE Conference on Computer Vision and Pattern Recognition), 2015, pp. 3431-3440 (Internet <URL: https://people.eecs.berkeley.edu/~jonlong/long_shelhamer_fcn.pdf).
First Office Action dated Nov. 21, 2023 issued for the corresponding Chinese Application No. 201880090926.0.

* cited by examiner

FIG. 7

CELLULAR IMAGE ANALYSIS METHOD, CELLULAR IMAGE ANALYSIS DEVICE, AND LEARNING MODEL CREATION METHOD

TECHNICAL FIELD

The present invention relates to a method and an apparatus for performing analysis processing of an observation image acquired for a cell and a learning model generation method for the analysis. More particularly, the present invention relates to a cell image analysis method, a cell image analysis device, and a learning model generation method suitable for non-invasively determining the state of a cell or acquiring cell information about the number of cells in the process, etc., of culturing pluripotent stem cells (ES cells or iPS cells).

BACKGROUND OF THE INVENTION

In a regenerative medicine field, researches using pluripotent stem cells, such as, e.g., iPS cells and ES cells, have been actively conducted in recent years. In researching and developing regenerative medicine using such pluripotent stem cells, a large number of undifferentiated cells in a state in which the pluripotency is maintained needs to be cultured. Therefore, it is necessary to select an appropriate culture environment and to stably control the environment, and it is also necessary to confirm the condition of cells which are being cultured at high frequency. For example, if a cell in a cell colony deviates from the undifferentiated state, then all cells within the cell colony will eventually transit to the deviated state because all the cells within the cell colony have the ability to differentiate. Therefore, the observer should daily check whether or not a cell that has deviated from the undifferentiated status (already differentiated cell or cell likely to differentiate, hereafter referred to as a "deviated cell") has occurred in a cell that are being cultured, and when a deviated cell is found, it is required to promptly remove it.

The determination of whether or not a pluripotent stem cell maintains the undifferentiated state can be assuredly performed by staining with an undifferentiated marker. However, because the stained cell dies, it is impossible to perform undifferentiated marker-staining to determine pluripotent stem cells for regenerative medicine. Therefore, in the current field of a cell culture for regenerative medicine, the observer determines whether or not it is an undifferentiated cell based on a morphological observation of the cell using a phase-contrast microscope. The reason of using a phase-contrast microscope is that a cell is generally transparent and is difficult to be observed under a normal optical microscope.

Recently, as disclosed in Non-Patent Document 1, a device for acquiring an observation image of a cell using a holography technology has also been put into practical use. As disclosed in Patent Documents 1 to 4 and the like, the device is configured to generate a phase image (since an in-line holographic microscopy (IHM) is used, hereinafter referred to as "IHM phase image") which is capable of clearly observing a cell, by performing data processing, such as, e.g., phase restoration and an image reconstruction, on hologram data acquired by a digital holographic microscopy. In a digital holographic microscopy, since it is possible to calculate phase information at an arbitrary distance at the stage of the calculation processing after acquiring hologram data, it is advantageous that the measurement time can be shortened without requiring every focusing at the time of the imaging.

However, even if a cell can be clearly observed to some extent in the phase contrast microscopic image or the IHM phase image, the observer needs to be skilled in accurately determining the undifferentiated cell or the like visually. In addition, it is inevitable that the determination is varied because the determination is based on a person's judgment. Therefore, such conventional techniques are not suitable for industrially mass-producing pluripotent stem cells.

In order to solve the above-mentioned problems, various techniques for evaluating the state of a cell by image processing an observation image of a cell have been conventionally proposed.

For example, Patent Document 5 describes a method in which the texture feature amount of a cell inner structure is calculated from a plurality of cell observation images acquired at predetermined time intervals, the difference and the correlation values of the texture feature amounts with respect to the plurality of cell observation images are calculated, and the degree of the cell activity is discriminated based on the time-series change thereof. In this method, for example, in a case where the difference value of the texture feature amount over time tends to decrease, it can be determined that the cell's activity is reducing or the like.

Further, Patent Document 6 describes a method in which a fuzzy neural network (FNN) analysis is performed using a plurality of index values acquired from a cell observation image and the cell's quality, such as, e.g., a growth rate, is predicted. Patent Document 6 also describes that a texture feature amount acquired by image processing on a cell observation image is used as an index value.

In the above-described conventional cell evaluation, a predetermined feature amount is utilized to determine the state and quality of a cell. There are various feature amounts that can be used for such determination, and an appropriate feature amount is selected in advance. However, if cell species to be observed, the culture condition or the like differ, an optimal feature amount may change for determining the cell condition or the like. Therefore, in order to perform the determination with high accuracy at all times, the feature amounts to be used must be changed depending on the cell species to be observed, the culture condition, and the like, and therefore the processing is very troublesome. In addition, when determining a cell cultured under a condition different from the previous condition, it is required to examine which feature amount is appropriate for the determination, and therefore there is also a problem that the cell determination efficiency is poor.

Further, in the above-described conventional cell evaluating methods, a false image of a feeder cell or a background region or a foreign substance such as dust is often erroneously determined as a target cell. For this reason, the accuracy of the determination is not high, although the processing is troublesome as described above. Furthermore, due to the limitation of the calculation time, it is necessary to divide the image into small regions of a plurality of pixel units and perform the determination for each small region. For that reason, there is a risk of missing a very small defective region and/or a foreign substance which is much smaller than the size of the small region.

PRIOR ART DOCUMENT

Patent Document

Patent Document 1: International Patent Publication No. 2017/203718 brochure

Patent Document 2: International Patent Publication No. 2017/204013 brochure
Patent Document 3: International Patent Publication No. 2016/084420 brochure
Patent Document 4: Japanese Unexamined Patent Application Publication No. 10-268740
Patent Document 5: U.S. Pat. No. 4,968,595
Patent Document 6: U.S. Pat. No. 5,181,385

Non-Patent Document

Non-Patent Document 1: "Cell Culture Analyzer CultureScanner CS-1", [online], Shimadzu Corporation, [Searched on Feb. 14, 2017], Internet <URL: https://www.an.shimadzu.co.jp/bio/cell/cs1/index.htm>
Non-Patent Document 2: Jonathan Long, and two others, "Fully Convolutional Networks for Semantic Segmentation", The IEEE Conference on Computer Vision and Pattern Recognition), 2015, pp. 3431-3440 (Internet <URL: https://people.eecs.berkeley.edu/~jonlong/long_shelhamer_fcn.pdf)

SUMMARY OF THE INVENTION

Problems to be Solved by the Invention

The present invention has been made to solve the above-mentioned problems, and a main object thereof is to provide a cell image analysis method and a cell image analysis device which do not require a selection or a consideration of a feature amount or the like used for determination when determining the state or the quality of a cell based on an observation image acquired for the cell. The object of the present invention is also to provide a learning model generation method used for the analysis.

Means for Solving the Problem

In recent years, there has been remarkable progress in image processing technique using deep learning or the like, which is one technique of machine learning using a multi-layer neural network. For the processing of image recognition or the like, in many cases, a convolutional neural network (CNN) is used. The convolutional neural network usually has a convolutional layer for extracting a feature of an image by convolution processing by a plurality of filters, a pooling layer for providing position invariance of local data by pooling processing for aggregating responses of a certain region, and a fully connected layer for connecting image data whose feature portions are extracted by the convolutional layer and the pooling layer into one node and outputting the value (feature variable) converted by an activation function.

Further, recently, a fully (or complete) convolutional neural network (FCN) has been proposed (see Non-Patent Document 2) in which the fully connected layer constituting the convolutional neural network is formed in a convolutional layer. In particular, applications in semantic segmentation is progressing.

By using machine learning, such as, e.g., a fully convolution neural network, it is possible to output a label image in which characteristic regions are identified with respect to an input image without determining a particular feature amount or the like in advance. The inventors of the present invention conceived to use a machine learning technique typified by a fully convolution neural network to identify a region, such as, e.g., an undifferentiated cell and a deviated cell in an observation image of a cell. However, to improve the accuracy of the discrimination by using a machine learning method, it is required to constitute a model by learning using a large amount of training data. It is time-consuming and labor-intensive to prepare a large amount of training data. Therefore, the present inventors have completed the present invention by not only simply using machine learning for performing segmentation of an observation image of a cell but also adding a technique in which prepared training data is appropriately expanded to increase the data amount.

A cell image analysis method according to the present invention made to solve the above-described problems is a cell image analysis method for performing segmentation related to a cell by analyzing an observation image of the cell, the cell image analysis method using machine learning as a technique of an image analysis for the segmentation. The method includes:
a) a learning image expansion step for generating a new learning image by rotating an input learning image by an arbitrary angle and compensating for a region in which an image has been lost by a rotation of the input learning image within a frame of a pre-rotation image by an image that continuously connects to a post-rotation image; and
b) a learning model generation step for generating a machine learning model by learning processing using a plurality of learning images including the input learning image and the learning image generated in the learning image expansion step.

A cell image analysis device according to the present invention made to solve the above-described problems is a device for performing the above-described cell image analysis method which is a cell image analysis device for performing segmentation related to a cell by analyzing an observation image of the cell, the cell image analysis device using machine learning as a technique for an image analysis for the segmentation. The device includes:
a) a learning image expansion processing unit configured to generate a new learning image by rotating an input learning image by an arbitrary angle and compensating for a region in which an image has been lost by a rotation of the input learning image within a frame of a pre-rotation image by an image that continuously connects to a post-rotation image;
b) a learning model generation unit configured to generate a machine learning model by learning processing using a plurality of learning images including the input learning image and the learning image generated in the learning image expansion unit; and
c) a region identification unit configured to output a label image by performing the segmentation on the input target cell observation image using a learned model generated by the learning model generation unit.

A learning model generation method according to the present invention made to solve the above-described problems is a method suitable for generating a learned model to be used in the above-described cell analysis method which is a learning model generation method for generating a learning model to be used when performing segmentation of an observation image by analyzing an observation image generated based on hologram data acquired by a holographic microscopy using a machine learning. The method includes:
rotating an input learning image by an arbitrary angle; and
generating a learning model by performing machine learning, by using a plurality of learning images including a learning image generated by compensating for a region in which an image has been lost by a rotation of the input learning image within a frame of a pre-rotation image by an image that continuously connects to a post-rotation image.

The machine learning technique used for the image analysis in the present invention is not limited to the method as long as it is possible to perform segmentation of an image based on learning results. The examples thereof include, in addition to deep learning including the above-described fully convolution neural network and convolutional neural network, a support vector machine (SVM), a random forest, and an AdaBoost.

In the present invention, as a learning image for learning a model of machine learning, a set of an observation image of a cell and a label image of a ground truth label image corresponding to the observation image, i.e., an image indicating an accurate segmentation result, is input. In the learning image expansion step, the input learning image is first rotated by an arbitrary angle. At this time, the rotation center may be a center point of the image or a point deviated from the center point of the image. The rotation angle may be random because it can be arbitrarily determined. The rotation results in a lost region in which no image is present within the frame of the pre-rotation learning image. Therefore, in the learning image expansion step, the lost region is compensated for by an image that continuously connects to the post-rotation image. The "image that continuously connects" denotes an image in which the contour of the cell and the cell colony appearing in the observation image are not interrupted and the inner pattern is also similar on both sides of the border between the lost region and the actual image.

A plurality of sets of learning images is rotated a plurality of times at random angles to generate a plurality of learning images. In the learning model generation step, a machine learning model is generated by learning processing using such learning images. By performing learning using a large amount of learning images, the accuracy of the model can be increased, which in turn can improve the accuracy of the segmentation with respect to a target cell observation image.

In the above-described learning image expansion step, although there is no particular limitation on how to generate a compensation image, the process is simple when the compensation image is generated using a post-rotation image. Therefore, as one aspect of the present invention, in the above-described learning image expansion step, it is preferable to compensate for the region in which the image has been lost by the rotation within the frame of a pre-rotation image by an image generated by a mirror-image inversion of an image within a frame of the post-rotation image with the frame of the post-rotation image as an axis so as to be continuously connected to the region. By using the mirror-image inversion, the images on both sides of the post-rotation image frame are assuredly connected, and the processing is very simple.

In addition, according to the above-described aspect, there is also the following advantage. For example, in the case of identifying a particular object, such as, e.g., a person and an automobile, by machine learning, the shape of the object is one of the key features. When the above-described mirror-image inversion is used for an image of such an object, the shape of the object becomes unnatural. Therefore, it is often not suitable for a learning image. On the other hand, a cell colony, which is a main observation target in the present invention, is formed by gathered individual cells. Therefore, the shape of a cell colony is diverse in the first place. Therefore, in order to properly identify a cell colony, it is required to learn other local features and the like without learning the shape itself. As described above, when mirror-image inversion is used, a learning image in which the external shape is diverse is generated even if the observation image of the same cell colony differs from each other in the region which has been lost at the time of the rotation. This makes it difficult to learn the shape, and makes it easier to learn the feature that does not change even by the rotation (i.e., rotationally invariant feature). Thus, it is possible to improve the identification accuracy of a cell colony. In other words, it can be said that the technique of expanding a learning image in the present invention is not suitably applied to machine learning for segmentation in personal identification, but is suitably applied to machine learning for segmentation in a cell observation.

As described above, various methods can be used as a machine learning method in the present invention. However, from the viewpoint of the discrimination performance, it is preferable to use a convolutional neural network, which is frequently used in semantic segmentation, and more preferably a fully convolution neural network. It is preferable to perform segmentation of an input image on a pixel-by-pixel basis by using a fully convolution neural network.

Note that, the fully convolution neural network described here includes not only the basic algorithm of the fully convolution neural network proposed in Non-Patent Document 2 but also various convolutional neural network methods derived from or improved from it.

The type, etc., of a cell to be observed and evaluated in the present invention is not particularly limited. However, in particular, the present invention is suitable for observing and evaluating a pluripotent stem cell including human iPS cells. In this case, the segmentation preferably distinguishes at least between an undifferentiated cell and a deviated cell or a differentiated cell.

According to this, it is possible to quickly and accurately determine noninvasively whether or not a deviated cell or a differentiated cell is generated in a pluripotent stem cell that is being cultured.

The segmentation may further identify a region in which a foreign substance is present. According to this, it is possible to take measures, such as, e.g., accurately detecting fine foreign substances, such as, e.g., dust mixed in the culture, and removing them.

In the present invention, the observation image of a cell may be a phase image, an intensity image, or the like acquired by arithmetic processing based on hologram data. However, in general, in a phase image, the cell pattern information appears more clearly as compared with the intensity image or the like. Therefore, it is generally preferable to use a phase image as an observation image.

The present invention may further include a cell information calculation step for estimating at least one of an area of a cell region, the number of cells, and a density of cells, based on a result of the segmentation related to a cell on the observation image of the cell.

Depending on the type of a cell, the approximate cell size is known. In the cell information calculation step, therefore, the area of the cell region is calculated based on the label image on which segmentation is performed, and the number of cells is calculated from the area of the cell region and the size of the cell. Thus, for example, the number of pluripotent stem cells that are being cultured can be quickly estimated.

The present invention may further include a display processing step for displaying a result of the segmentation related to a cell on the observation image of the cell or a determination result of a cell state based on the segmentation on a display screen of a display unit so as to be superimposed on the observation image. It should be noted that the segmentation result may represent the identified regions in different colors.

According to this, the observer can grasp, for example, the result, etc., of the discrimination between the undifferentiated cell and the deviated cell, together with the information on the outer shape of the cell and information on the pattern, on one image.

Effects of the Invention

According to the present invention, for example in a site where pluripotent stem cells, such as, e.g., iPS cells and ES cells, are cultured, it is possible to quickly and accurately determine noninvasively whether or not the cell that is being cultured maintains the undifferentiated state or is in the deviated state, or whether or not a deviated cell is present in the cell colony, or whether or not a foreign substance such as dust is contaminated. Thereby, the quality control of the cell that is being cultured is facilitated, which in turn can improve the productivity in cell culture. Further, according to the present invention, even in cases where the number of prepared training data is small, the learning performance can be improved by increasing the number based on the input training data (data augmentation). This saves time and labor for preparing a large amount of training data. Further, according to the present invention, it is possible to perform learning which is particularly effective for increasing the identification performance of a cell colony, etc. Thus, it is possible to improve the accuracy of the identification.

EMBODIMENTS FOR CARRYING OUT THE INVENTION

Hereinafter, an example of a cell image analysis method and a cell image analysis device according to the present invention will be described with reference to the attached drawings.

Figure 1:
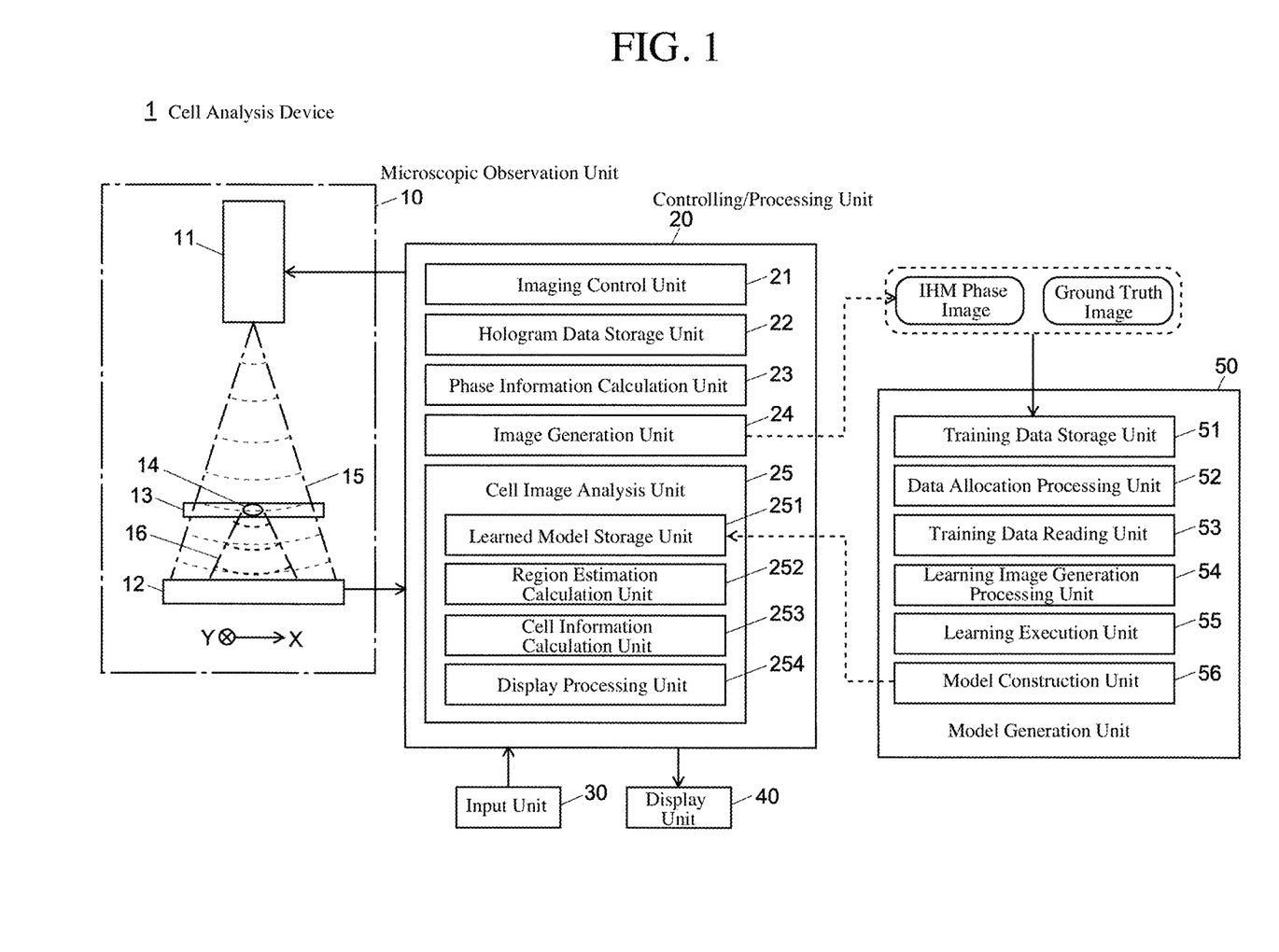
FIG. 1 is a schematic configuration diagram of a cell analysis device using a cell image analysis device according to the present invention.

FIG. 1 is a schematic configuration diagram of a cell analysis device using a cell image analysis device for carrying out a cell image analysis method according to the present invention.

The cell analysis device 1 of this example is provided with a microscopic observation unit 10, a controlling/processing unit 20, an input unit 30 and a display unit 40 as user interfaces, and a model generation unit 50.

The microscopic observation unit 10 is an in-line holographic microscopy (IHM), and is provided with a light source unit 11 including a laser diode, etc., and an image sensor 12. A culture plate 13 including a cell colony (or cell alone) 14 is arranged between the light source unit 11 and the image sensor 12.

The controlling/processing unit 20 controls the operation of the microscopic observation unit 10 and processes the data acquired by the microscopic observation unit 10. The controlling/processing unit 20 is provided with an imaging control unit 21, a hologram data storage unit 22, a phase information calculation unit 23, an image generation unit 24, and a cell image analysis unit 25 as functional blocks. The cell image analysis unit 25 includes a learned model storage unit 251, a region estimation calculation unit 252, a cell information calculation unit 253, and a display processing unit 254 as lower functional blocks.

The model generation unit 50 includes, as functional blocks, a training data storage unit 51, a training data allocation processing unit 52, a training data reading unit 53, a learning image generation processing unit 54, a learning execution unit 55, and a model construction unit 56. The learned model generated in the model generation unit 50 is stored in the storage unit of the controlling/processing unit 20, and functions as the learned model storage unit 251.

Normally, the entity of the controlling/processing unit 20 is a personal computer or a more sophisticated workstation on which predetermined software is installed, or a computer system including a high-performance computer connected to such a computer via a communication line. That is, the function of each block included in the controlling/processing unit 20 can be embodied by the processing using various data stored in the computer or the computer system, the data being executed by executing software installed on a computer system including a single computer or a plurality of computers.

The entity of the model generation unit 50 is also a personal computer or a higher performance workstation with a predetermined software installed. Normally, the computer is a computer that differs from that of the controlling/processing unit 20, but may be the same. In other words, the function of the model generation unit 50 can also be given to the controlling/processing unit 20.

First, in the cell analysis device 1 of this example, the operations and the processing up to the generation of an IHM phase image, which is an observation image used when performing segmentation related to a cell is executed, will be described.

When an operator sets a culture plate 13 including a cell colony 14 in a predetermined position and performs predetermined operations with the input unit 30, the imaging control unit 21 controls the microscopic observation unit 10 to acquire hologram data as follows.

That is, the light source unit 11 irradiates a predetermined region of the culture plate 13 with coherent light having a small angular spread of about 10°. The coherent light (object light 16) transmitted through the culture plate 13 and the cell colony 14 reaches the image sensor 12 while interfering with the light (reference light 15) transmitted through a region close to the cell colony 14 on the culture plate 13. The object light 16 is light whose phase has been changed when passing through the cell colony 14, while the reference light 15 is light which does not pass through the cell colony 14 and therefore does not undergo a phase change due to the colony 14. Therefore, an image by the fringe of the object light 16 whose phase has been changed by the cell colony 14 and the reference light 15 whose phase has not been changed is formed on the detecting plane (image plane) of the image sensor 12.

Note that the light source unit 11 and the image sensor 12 are sequentially moved in the X-axis direction and the Y-axis direction by a moving mechanism (not shown). With this, the irradiation region (observation region) of the coherent light emitted from the light source unit 11 is moved on the culture plate 13, so that it becomes possible to acquire hologram data (two-dimensional light intensity distribution data of the hologram formed on the detection surface of the image sensor 12) over the wide two-dimensional region.

As described above, the hologram data acquired by the microscopic observation unit 10 is sequentially sent to the controlling/processing unit 20 and stored in the hologram data storage unit 22. In the controlling/processing unit 20, the phase information calculation unit 23 reads the hologram data from the hologram data storage unit 22 and executes predetermined calculation processing for phase restoration to calculate the phase information of the entire observation region (imaging region). The image generation unit 24 generates an IHM phase image based on the calculated phase information. In calculating the phase information and generating the IHM phase image, a well-known algorithm disclosed in Patent Documents 3, 4, or the like may be used. Note that the phase information calculation unit 23 may calculate, in addition to the phase information based on the hologram data, strength information and pseudo phase information. The image generation unit 24 may generate a reproduced image based on the information, i.e., an intensity image or a pseudo phase image.

Figure 5:
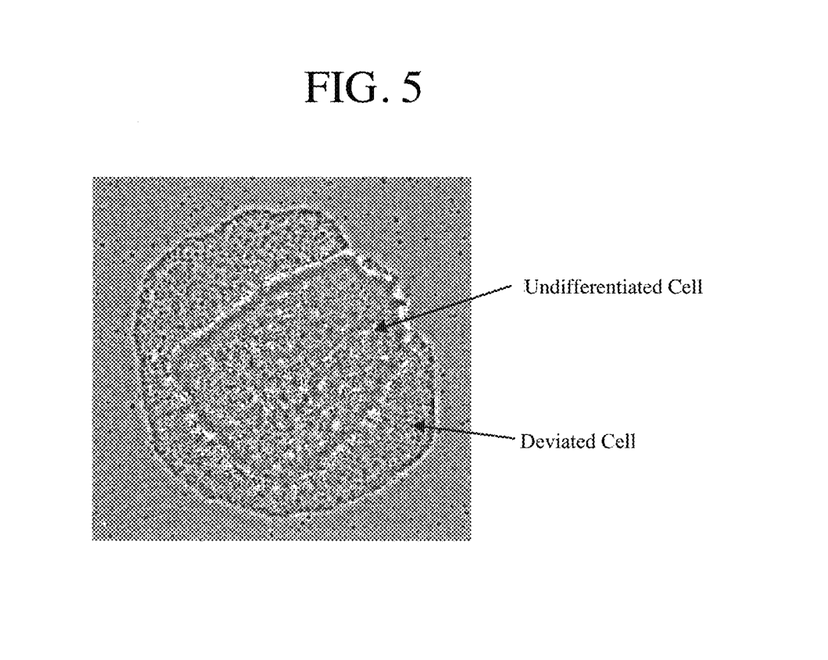
FIG. 5 is a diagram illustrating an example of an IHM phase image (a deviated cell colony).

An example of an IHM phase image targeting a deviated cell colony in an iPS cell is shown in FIG. 5. It is known that a typical deviated cell feature is "thinning out". From this feature, the undifferentiated cell region and the deviated cell region can be visually recognized even in FIG. 5. An operator with the experience to some extent can distinguish between the undifferentiated cell region and the deviated cell region by observing such an image. However, visually distinguishing large amounts of IHM phase images one by one is a significant burden. In addition, in an image that is more difficult to identify, the identification result often differs depending on the operator. On the other hand, in the cell analysis device 1 of this example, it is possible to automatically distinguish the undifferentiated cell region from the deviated cell region by performing segmentation on the IHM phase image by using the fully convolution neural network, which is one of machine learning methods.

Figure 4:
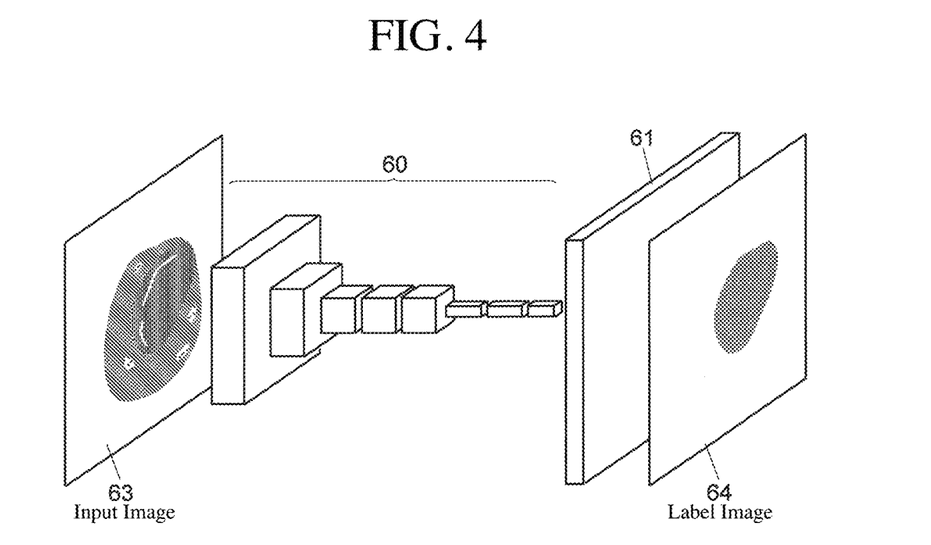
FIG. 4 is a conceptual diagram of a configuration of a fully convolution neural network used in a cell analysis device of this example.

FIG. 4 is a conceptual diagram of the configuration of a fully convolution neural network. The configuration and the processing of the fully convolution neural network are described in detail in many documents, including Non-Patent Document 2. It may also be implemented using commercially available or free software such as "MATLAB" provided by MathWorks, USA. For this reason, a schematic description will be given here.

As shown in FIG. 4, a fully convolution neural network includes, for example, a multilayer network 60 in which repeats of a convolutional layer and a pooling layer are multilayered, and a convolutional layer 61 corresponding to a fully connected layer in a convolutional neural network. In this case, in the multilayer network 60, convolution processing using a filter (kernel) having a predetermined size and pooling processing for two-dimensionally reducing the convolution result to extract the valid value are repeated. Note that the multilayer network 60 may be configured only by a convolutional layer without pooling layers. In the final stage convolutional layer 61, local convolution and deconvolution are performed while sliding a filter having a predetermined size within the input image. In this fully convolution neural network, a label image 64 labeled with the undifferentiated cell region, the deviated region, or the background region in which no cell exists can be output by performing segmentation on the input image 63 such as an IHM phase image.

Here, the multilayer network 60 and the convolutional layer 61 are designed so as to carry out labeling of an input IHM phase image on a pixel-by-pixel basis in order to distinguish a minute foreign substance such as dust mixed in a cell that is being cultured. That is, the smallest unit of one region to be labeled in the label image 64, which is an output image, is one pixel on the IHM phase image. Therefore, for example, even in cases where a foreign substance having a size of about 1 pixel is observed on an IHM phase image, the foreign substance is detected as one region in the label image 64, and therefore it is possible to accurately provide the operator with the information on where the foreign substance is present.

In order to perform the above-described segmentation by a fully convolution neural network, it is required to learn the coefficient (weight) of the filter in each of the plurality of convolutional layers included in the multilayer network 60 and the convolutional layer 61 of the last stage and to configure a learned model in advance using a large number of image data for learning. The operation when performing the learning processing in the model generation unit 50 will be described with reference to the flowchart shown in FIG. 2. In this case, learning is performed using a stochastic gradient descent method, which is generally often used in machine learning. This method is a method of repeating learning while dividing a given large number of training data by a predetermined mini-batch unit. The training data is shuffled randomly, so there is a merit that it becomes difficult to fit into a localized solution.

Figure 2:
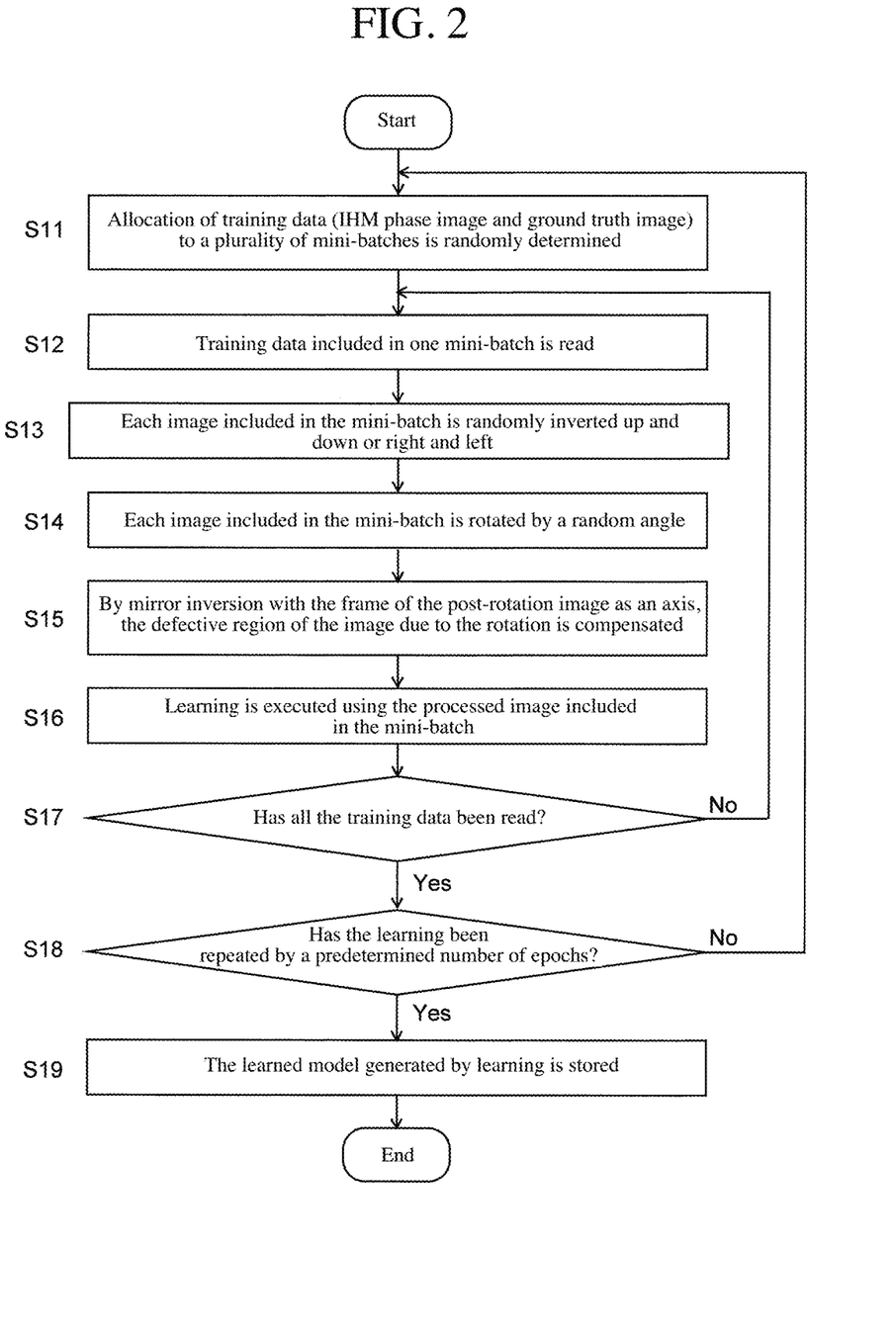
FIG. 2 is a flowchart showing a flow of learning processing when generating a learning model in a cell analysis device of this example.

The training data storage unit 51 of the model generation unit 50 stores in advance a large number of pieces of training data each including a set of an IHM phase image generated by the image generation unit 24 and a corresponding ground truth image. The ground truth image is a type of a label image in which an IHM phase image is accurately segmented into an undifferentiated cell region, a deviated region (including differentiated cell regions), a background region, and a foreign substance region. Examples of generating a ground truth image will be described later. For the convenience of explanation, it is assumed that the number of training data is 100 (100 pieces of IHM phase images).

In the model generation unit 50, the data allocation processing unit 52 randomly determines training data to be allocated to a plurality of mini-batches according to a predetermined batch size (Step S1). It is supposed that the number of mini-batches is 5 and the number of training data allocated to a single mini-batch is 20.

The training data reading unit 53 sequentially reads the training data included in one mini-batch from the training data storage unit 51 in accordance with the allocation determined by the data allocation processing unit 52 (Step S12). The learning image generation processing unit 54 performs up/down inversion or left/right inversion of the image with random probabilities with respect to the read learning image (IHM phase image and ground truth image) (Step S13). The processing of Step S13 may be executed after Step S15 which will be described later.

The learning image generation processing unit 54 further rotates the upside-down inverted or leftward-rightward inverted or non-inverted learning image by a randomly determined angle θ when reading the image (Step S14). The center of the rotation operation at this time may be the center point of the image, or may be a point deviated from the center point. (b) of FIG. 6 is an example in which the image shown in (a) of FIG. 6 is rotated by an angle θ in the left direction.

Figure 6:
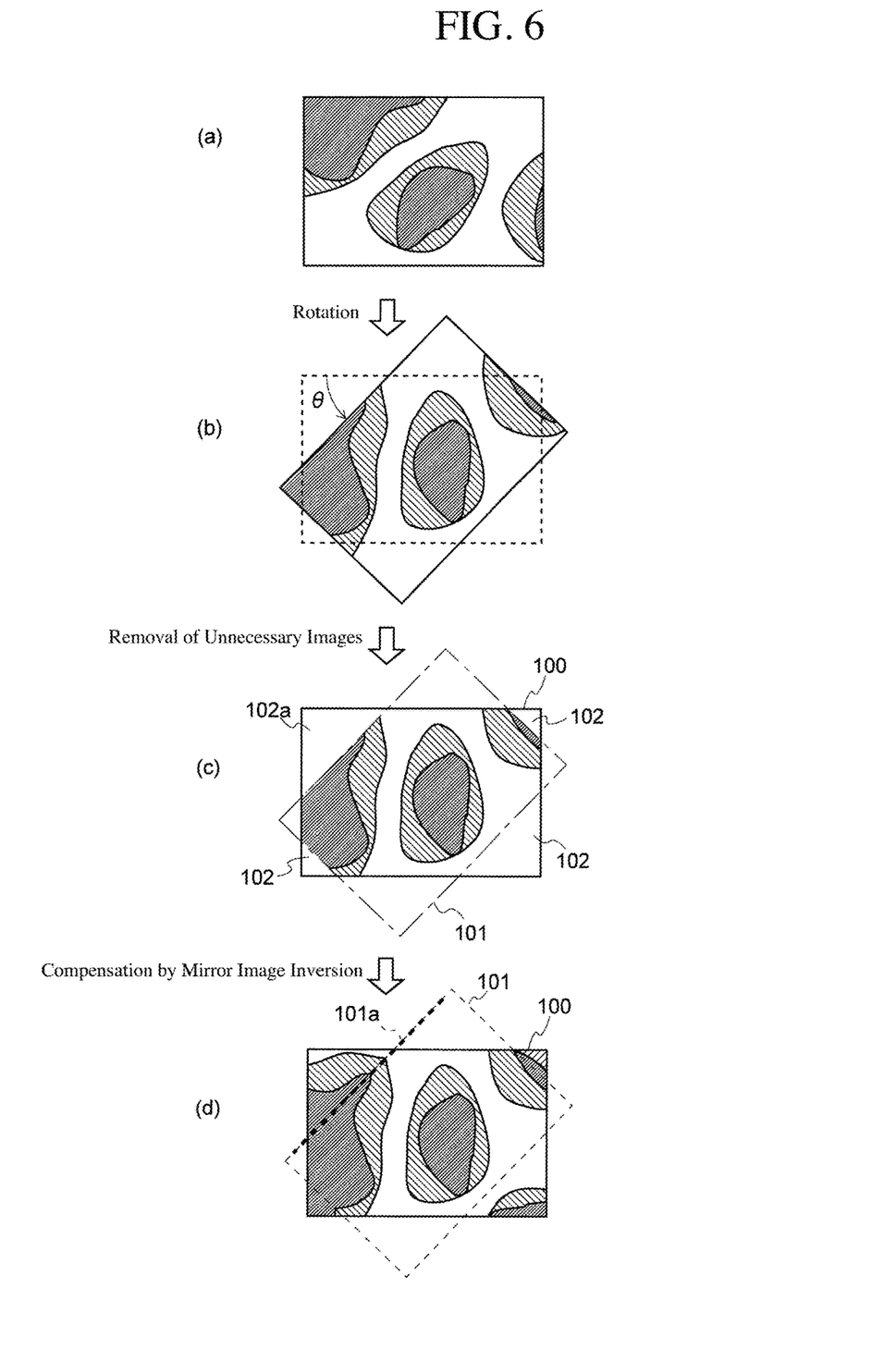
FIG. 6 is an explanatory diagram of learning image generation processing at the time of learning model generation.

After rotating the image, the learning image generation processing unit 54 removes the portions protruding from the image frame 100 of the pre-rotation image by the rotation, as shown in (c) of FIG. 6. Further, as shown in (d) of FIG. 6, the regions 102 (102*a*) in which an image is missing within the image frame 100 is compensated for by an axis symmetric image about the image frame 101 of the post-rotation image, that is, a mirror-image inverted image (Step S15). For example, the image lost region 102*a* in (c) of FIG. 6 is compensated for by an image acquired by mirror-image inverting the image within the image frame 101*a* with the image frame 101*a* in (d) of FIG. 6 as the axis. Thus, as shown in (d) of FIG. 6, a new image that fits within the image frame 100 of the original image without excess or deficiency is generated. A new learning image is generated by performing similar image transformation processing on the IHM image and the ground truth image as a set.

The learning execution unit 55 performs the learning of the fully convolution neural network by using a plurality of training data included in one mini-batch generated through the processing of inverting or rotating as described above (Step S16). The filtering coefficient at a plurality of convolutional layers in the network is learned so that the result of the segmentation by the fully convolution neural network becomes as close as possible to the ground truth image.

Thereafter, the training data reading unit 53 determines whether or not all training data have been read, that is, whether or not all mini-batches have been learned (Step S17). When it is determined No in Step S17, the processing returns to Step S12 because some of the plurality of mini-batches for which allocation of the training data has been determined in Step S11 have not been learned yet. Then, the training data reading unit 53 reads the training data included in another mini-batch. Thus, the processing of Steps S12 to S17 is repeated by the number of mini-batches, five times in this case.

When it is determined No in Step S17, the data allocation processing unit 52 determines whether or not the processing of Step S111 has been repeated for a predetermined number of epochs (Step S18). When it is determined No in Step S18, the processing returns from Step S18 to Step S11, and the data allocation processing unit 52 randomly determines training data to be allocated to a plurality of mini-batches. Therefore, training data allocated to each mini-batch is shuffled. The number of the epoch value is appropriately determined in advance, but is usually a large value, for example, 1,000 times. That is, the processing of Step S11 to Step S18 are repeated by this number of epochs, and the learning is advanced in the course of the repetition. When it is determined Yes in Step S18, the learning is finished, and the model construction unit 56 constructs and stores the learning model based on the learning result (Step S19).

Even if the number of training data is, for example, 100, since the image is rotated at a randomly determined angle for each epoch, the training data is expanded by the number of epochs except when the same angle is accidentally selected. In other words, when the number of epochs is 1,000, substantially the same learning effects as when 100,000 pieces of training data are prepared can be acquired. In other words, even if the number of original learning images is small, learning can be performed based on a large number of expanded learning images.

Figure 7:
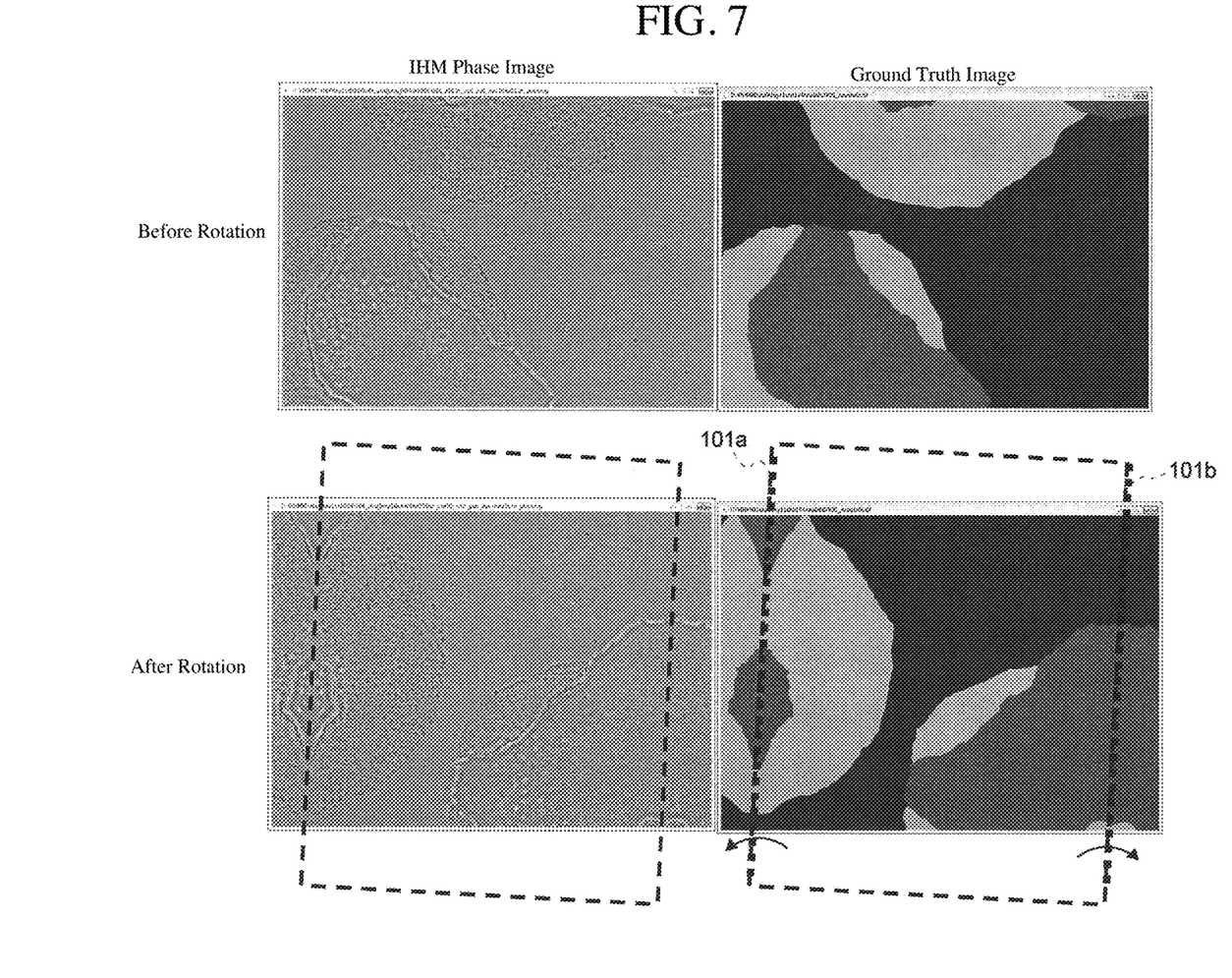
FIG. 7 is a diagram showing an example of learning image generation processing at the time of learning model generation.

The features of the image compensated for by the mirror-image inversion with the post-rotation image frame 101 as an axis are that the images on both sides of the post-rotation image frame 101 always have continuity, that is, the outline of the cell or the like is not interrupted by the image frame 101, and the pattern in the cell becomes almost the same. FIG. 7 is an example of an input IHM phase image and a ground truth image, and a pseudo IHM phase image which is a learning image newly generated from them and a ground truth image.

Since a cell colony in a culture cell is formed by gathered cells, the shape and size are diverse. In other words, it is not appropriate to learn the shape and size of an object for the purpose of identifying the region of the cell colony. Conversely, by learning an image in which the shape and size of a cell colony is diverse, it is possible to learn the feature amount that differs from the shape and size. Further, since a shape of a cell colony is diverse as described above, even if the region in which the image has been lost due to the rotation is compensated for by a mirror-image inversion image, unnaturalness as in the case of mirror-image inversion of a general image of a person, a particular object, or the like does not occur. When the image is compensated for by the mirror-image inversion image, the outline of the cell colony is not interrupted within the image frame 101, and the pattern inside the cell colony becomes the same on both sides of the image frame 101. That is, the continuity of the image is substantially maintained on both sides of the image frame 101. On the other hand, the diversity of the shape and size of the cell colony on the image increases. Therefore, by using the learning image expanded as described above, it is possible to effectively learn the feature that does not change even when the image is rotated (i.e., rotationally invariant feature).

As described above, even in cases where the number of the input training data is small, the training data can be greatly expanded, and the training data is suitable for identifying a cell colony and the like. Therefore, the learning model configured based on such training data becomes a model capable of performing high-precision segmentation.

Figure 3:
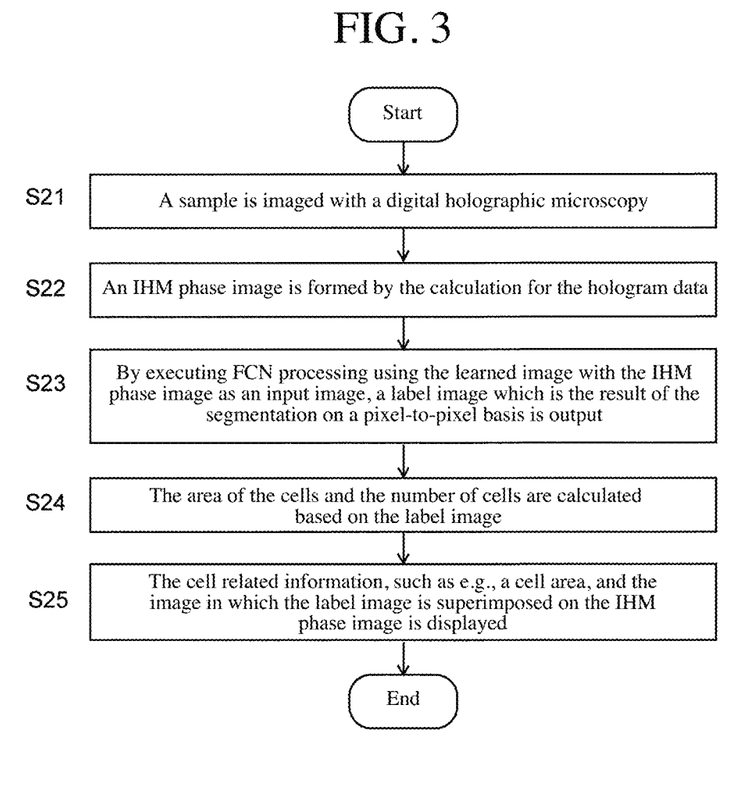
FIG. 3 is a flowchart showing a flow of segmentation estimation processing in a cell analysis device of this example.

Next, according to the flowchart shown in FIG. 3, the operation at the time of the segmentation with respect to the target IHM phase image, which is performed by the cell image analysis unit 25, will be described.

As described above, the microscopic observation unit 10 performs imaging of a sample (e.g., the cell colony 14 in the culture plate 13) (Step S21). The phase information calculation unit 23 and the image generation unit 24 perform phase calculations based on the resulting hologram data to form an IHM phase image (Step S22). Thereafter, the region estimation calculation unit 252 reads the IHM phase image as an input image, performs the processing by a fully convolution neural network using the learning model stored in the learned model storage unit 251, and outputs a label image corresponding to the input image (Step S23).

This label image is an image in which, in the IHM phase image which is an input image, the undifferentiated cell region, the deviated cell region, the background region, the foreign substance region, and the like are identified on a pixel-by-pixel basis, and the respective regions are segmented with different display colors, that is, semantic segmented colors. As described above, since the learning model used at this time is capable of performing segmentation with high accuracy, it is possible to perform segmentation of each region on the IHM phase image of the cell to be observed with high accuracy on a pixel-by-pixel basis.

The cell information calculation unit 253 calculates the area of the undifferentiated cell region and the area of the deviated cell region in the acquired label image. When the area is calculated, the magnification information at the time of imaging the sample with the microscopic observation unit 10 may be used. Then, the numbers of cells and the density of cells present in each region are estimated from the area of the undifferentiated cell region and the area of the deviated cell region based on the information of the average size of one cell given in advance (Step S24).

The display processing unit 254 generates an image in which the label image is superimposed on the IHM phase image generated by the image generation unit 24, that is, an IHM phase image in which respective regions such as undifferentiated cell regions are color-coded on a pixel-by-pixel basis. Then, this image and the information of the cell area, the number of cells, and the cell density acquired in Step S25 are displayed on the screen of the display unit 40 (Step S25).

Thus, for example, it is possible to provide an operator with an image in which the undifferentiated cell region and the deviated cell region can be easily grasped on the observation image of the cell colony.

Next, an example will be described in which the above-described image analysis was applied to the IHM phase image actually acquired by the device described in Non-Patent Document 1.

The ground truth image used for the learning processing was generated in the following steps.

(1) A cytoskeleton stained image in which the target cell was actin-stained was acquired, and the cell region was defined on the image. This cell region includes the undifferentiated cell, the deviated cell, and the differentiated cell.

(2) An undifferentiated marker stained image was acquired using a stain method that detects the expression of an undifferentiated marker (Oct-3/4) within the target cell, and the undifferentiated cell region was defined on the image.

(3) The cell region defined in (1) and the undifferentiated cell region defined in (2) were combined to generate a ground truth image in which the undifferentiated cell region, the deviated cell region, and the background region were segmented.

Figure 8:
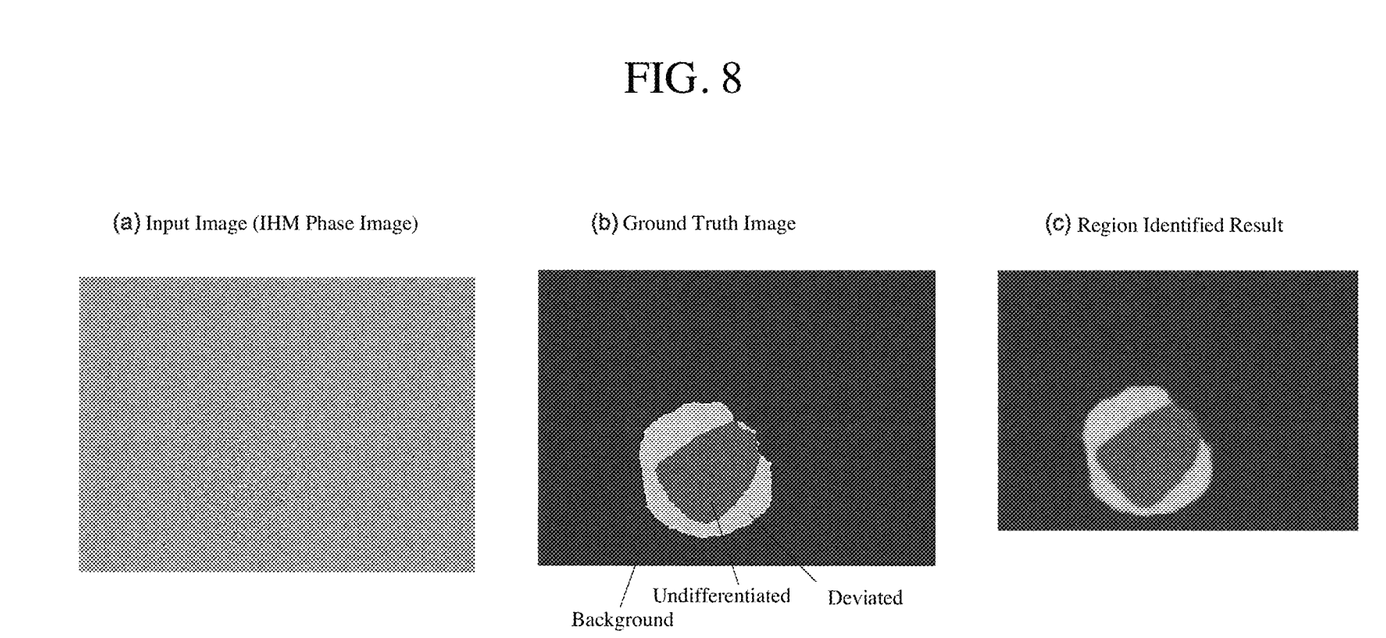
FIG. 8 is a diagram illustrating (a) an IHM phase image, (b) a ground truth image used for learning processing, and (c) a label image that is a segmentation result, for a deviated cell colony.

A number of sets of the IHM phase image (or image obtained by processing this phase image) and the corresponding ground truth image were used to generate a learning model of three classifications (background, undifferentiated deviation, undifferentiated) of the fully convolution neural network. FIG. 8 shows an example in which the segmentation was performed by a fully convolution neural network using the generated learning models. (a) of FIG. 8 shows an IHM phase image to be processed, and the cell colony is the same as shown in FIG. 5. (b) of FIG. 8 is a ground truth image for the IHM phase image shown in (a) of FIG. 8. (c) of FIG. 8 is an image showing the segmentation result by the fully convolution neural network. Comparing (b) FIG. 8 and (c) of FIG. 8, it can be seen that the regions are almost accurately identified.

Using the above-described fully convolution neural network, 192 pieces of IHM phase images capturing colonies of human iPS cells cultured in feeder-free (culture method not using a feeder cell) were subjected to region discrimination. As a result, both the sensitivities and the specificities were over 90% as assessed by cross-validation. This confirmed the effectiveness of this technique.

Note that in the above-described example, a fully convolution neural network is used as a machine learning method for segmentation. However, it is obvious that a normal convolutional neural network may be used. Further, the present invention is effectively applied not only to a machine learning method using a neural network but also to a machine learning method capable of performing segmentation of an image. As such a machine learning method, support vector machines, random forests, and AdaBoost can be exemplified.

In addition, in the above-described example, the present invention is mainly applied to the identification of the undifferentiated cell and the deviated cell in a cell colony or to the detection of the contaminated foreign substances. However, the present invention can be used for the identification and detection of other matters related to a cell. For example, it is obvious that the present invention can be applied to distinguish between a nucleus and a cell in one cell.

Further, in the above-described example, an IHM phase image formed by the arithmetic processing using hologram data is the target of the segmentation processing. However, an intensity image or a pseudo phase image formed by arithmetic processing using hologram data can also be the target of the segmentation processing. An ordinary optical microscope image may be used as long as a cell is sufficiently observable.

Further, in the cell analysis device 1 shown in FIG. 1, all processing is performed by the controlling/processing unit 20. However, in general, the calculation of phase information based on hologram data and imaging of the calculation results require an enormous amount of calculations. For this reason, it takes a lot of time to perform calculations in commonly used personal computers, and it is difficult to perform an efficient analysis operation. Therefore, a personal computer connected to the microscopic observation unit 10 may be used as a terminal device, and a computer system in which the terminal device and a server that is a high-performance computer are connected via a communication network such as the Internet or an intranet may be used.

Further, in the cell analysis device of the above-described example, an in-line holographic microscopy was used as the microscopic observation unit 10. However, as long as a microscope can acquire a microscope hologram, it is naturally replaceable with a holographic microscopy of other types such as an off-axis (off-axis) type, or a phase-shift type.

It is obvious that the above-mentioned examples and the above-mentioned various modified examples are examples of the present invention, and the scope of the present claims encompasses further arbitral modifications, changes, and additions within the scope of the present invention.

DESCRIPTION OF SYMBOLS

1: Cell analysis device
10: Microscopic observation unit

11: Light source unit
12: Image sensor
13: Culture plate
14: Cell colony
15: Reference light
16: Object light
20: Controlling/processing unit
21: Imaging control unit
22: Hologram data storage unit
23: Phase information calculation unit
24: Image generation unit
25: Cell image analysis unit
   251: Learned model storage
   252: Region estimation calculation unit
   253: Cell information calculation unit
   254: Display processing unit
30: Input unit
40: Display unit
50: Model generation unit
51: Training data storage unit
52: Training data allocation processing unit
53: Training data reading unit
54: Learning image generation processing unit
55: Learning execution unit
56: Model construction unit

The invention claimed is:

1. A cell image analysis method for performing segmentation of an observation image of a cell by using machine learning, the method comprising:
   a) a learning image expansion step for generating a new learning image by rotating an input learning image by an arbitrary angle and compensating for a region in which an image has been lost by a rotation of the input learning image within a frame of a pre-rotation image by an image that continuously connects to a post-rotation image; and
   b) a learning model generation step for generating a machine learning model configured to perform the segmentation of the observation image by learning processing using a plurality of learning images including the input learning image and the learning image generated in the learning image expansion step,
   wherein the region in which the image has been lost by the rotation within the frame of the pre-rotation image is compensated for by an image generated by a mirror-image inversion of an image within a frame of the post-rotation image with the frame of the post-rotation image as an axis so as to be continuously connected to the region.

2. The cell image analysis method as recited in claim 1, wherein the machine learning is a convolutional neural network.

3. The cell image analysis method as recited in claim 2, wherein segmentation of an input image is performed on a pixel-by-pixel basis using the fully convolution neural network.

4. The cell image analysis method as recited in claim 3, wherein the segmentation further distinguishes a region in which a foreign substance is present.

5. The cell image analysis method as recited in claim 1, wherein the convolutional neural network is a fully convolution neural network.

6. The cell image analysis method as recited in claim 1, wherein a cell included in a sample is a pluripotent stem cell including a human iPS cell, and the segmentation distinguishes at least between an undifferentiated cell and a deviated cell or a differentiated cell.

7. The cell image analysis method as recited in claim 1, wherein the observation image of the cell is a phase image acquired by an arithmetic processing based on hologram data.

8. The cell image analysis method as recited in claim 1, further comprising:
   a cell information calculation step for estimating at least one of an area of a cell region, the number of cells, and a density of cells, based on a result of the segmentation related to a cell on the observation image of the cell.

9. The cell image analysis method as recited in claim 1, further comprising:
   a display processing step for displaying a result of the segmentation related to a cell on the observation image of the cell or a determination result of a cell state based on the segmentation on a display screen of a display unit so as to be superimposed on the observation image.

10. A cell image analysis device for performing segmentation of an observation image of a cell by using machine learning, the device comprising:
   a) a learning image expansion processing unit configured to generate a new learning image by rotating an input learning image by an arbitrary angle and compensating for a region in which an image has been lost by a rotation of the input learning image within a frame of a pre-rotation image by an image that continuously connects to a post-rotation image;
   b) a learning model generation unit configured to generate a machine learning model configured to perform the segmentation of the observation image by learning processing using a plurality of learning images including the input learning image and the learning image generated in the learning image expansion unit; and
   c) a region identification unit configured to output a label image by performing the segmentation on the input target cell observation image using a learned model generated by the learning model generation unit,
   wherein the region in which the image has been lost by the rotation within the frame of the pre-rotation image is compensated for by an image generated by a mirror-image inversion of an image within a frame of the post-rotation image with the frame of the post-rotation image as an axis so as to be continuously connected to the region.

11. A learning model generation method for generating a machine learning model to be used when performing segmentation of an observation image of a cell by using machine learning, the observation image being generated based on hologram data acquired by a holographic microscopy, the method comprising:
   rotating an input learning image by an arbitrary angle; and
   generating the machine learning model configured to perform the segmentation of the observation image of the cell by performing machine learning, by using a plurality of learning images including a learning image generated by compensating for a region in which an image has been lost by a rotation of the input learning image within a frame of a pre-rotation image by an image that continuously connects to a post-rotation image,
   wherein the region in which the image has been lost by the rotation within the frame of the pre-rotation image is compensated for by an image generated by a mirror-image inversion of an image within a frame of the post-rotation image with the frame of the post-rotation image as an axis so as to be continuously connected to the region.

* * * * *